United States Patent [19]

Thawley et al.

[11] 4,101,150
[45] Jul. 18, 1978

[54] EXPANSION JOINTS

[75] Inventors: Clive Stafford Thawley; Thomas Shepherd, both of Dumfries, Scotland

[73] Assignee: Uniroyal Limited, Newbridge, England

[21] Appl. No.: 721,925

[22] Filed: Sep. 9, 1976

[30] Foreign Application Priority Data

Oct. 13, 1975 [GB] United Kingdom ............... 41813/75

[51] Int. Cl.² ..................... F16L 27/10; F16L 51/02
[52] U.S. Cl. ................................. 285/226; 285/229
[58] Field of Search ................. 285/229, 235, 226, 224

[56] References Cited

U.S. PATENT DOCUMENTS

| | | | |
|---|---|---|---|
| 1,696,435 | 12/1928 | Fraley | 285/229 |
| 2,953,618 | 9/1960 | Buono et al. | 285/229 X |
| 3,051,512 | 8/1962 | Cranston | 285/229 X |
| 3,139,115 | 6/1964 | Bawcom et al. | 285/229 X |
| 3,305,251 | 2/1967 | Skinner | 285/235 X |
| 3,363,918 | 1/1968 | Fisher | 285/229 |
| 3,429,592 | 2/1969 | Merkwacz | 285/229 |
| 3,580,616 | 5/1971 | Merkwacz | 285/229 |
| 3,612,176 | 10/1971 | Bauer et al. | 285/224 X |

FOREIGN PATENT DOCUMENTS

| | | | |
|---|---|---|---|
| 2,232,239 | 12/1974 | France | 285/229 |
| 1,192,496 | 5/1970 | United Kingdom | 285/226 |

Primary Examiner—Thomas F. Callaghan
Attorney, Agent, or Firm—Jay L. Chaskin

[57] ABSTRACT

An expansion joint or dredging sleeve having a body built up from a rubber and fabric ply construction at least one section of the body being reinforced by a reinforcing structure comprising a ring of rubber having a Shore A hardness of not less than 70° sandwiched between two rings of fabric comprising cords which have a compression deflection characteristic measured as described herein not exceeding 1% under a load of 40 kg. said cords extending substantially circumferentially of the rings.

15 Claims, 5 Drawing Figures

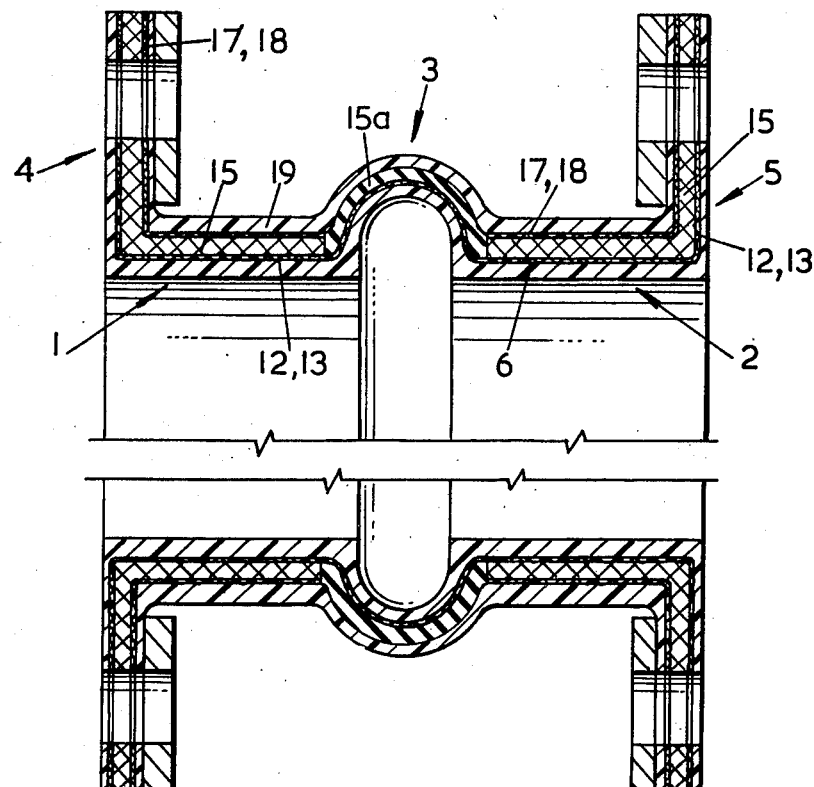
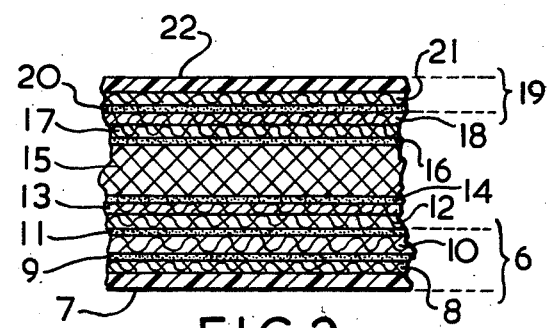

EXPANSION JOINTS

This invention relates to expansion joints for use between two lengths of rigid pipeline, or between a length or rigid pipeline and a piece of equipment to which the pipeline is connected, and also to dredging sleeves.

Conventional expansion joints as aforesaid comprise a ring having two axial end sections joined by at least one outwardly directed arch, the end sections and the or each arch piece being built up from a rubber and fabric ply construction and the end sections being reinforced by steel rings and by hard rubber rings. Each end section terminates in a flange construction to which the pipeline or the equipment may be bolted.

Expansion joints of this type have a number of disadvantages. The steel reinforcing rings must be rolled to a specified diameter for each type of joint and it is necessary to stock a large number of ring sizes. Fitting of the rings and the rubber filler strips during the building of the joints can be a slow, tedious operation and the joint in each steel ring may require to be welded in situ, which is again a slow operation. When expansion joints of this type are distorted beyond the elastic limit in use, then permanent deformation of the steel rings occurs, thus rendering the joint totally unserviceable.

Dredging sleeves are commonly built up from a rubber and fabric ply construction and incorporate steel reinforcing rings at intervals along their length. The disadvantages in manufacture and use are similar to those set forth above for expansion joints.

According to the present invention an expansion joint or dredging sleeve has a body built up from a rubber and fabric ply construction, and at least one section of the body is reinforced by a reinforcing structure comprising a ring of rubber having a Shore A hardness of not less than 70° sandwiched between two rings of a fabric comprising cords which have a compression deflection characteristic measured as described herein not exceeding 1% under a load of 40 kg., said cords extending substantially circumferentially of the rings.

The compression deflection characteristic is, for the purposes of this specification, measured in accordance with the method described later in the specification.

Use of a hard rubber and cord reinforcing structure has many advantages over the previously used steel reinforcing rings. The fabric may be cut from a roll and subsequently calendered with a layer of rubber to assist adhesion of the fabric to the remaining components of the joint. No joining of the two ends of the fabric layers or of the hard rubber layer is necessary, other than that automatically effected during curing of the expansion joint. During the stage of wrapping the joint for curing, the reinforcing structure is able to move so that the tension from the wrapping operation is fully transferred to the layers lying radially inwardly of the reinforcing structure. When steel rings were used these could prevent the tension from being fully transmitted to these radially innermost plies, so leading to possible delamination in the finished joint. Furthermore, a reinforcing structure as aforesaid is not permanently deformed if a high distortion load is applied to it and it is able to recover on removal of the stress so that the joint remains serviceable.

An expansion joint according to the invention preferably comprises two annular end sections joined by a central outwardly arched section, each end section being reinforced by a reinforcing structure as aforesaid. Some joints have more than one arched section and in such cases preferably the annular sections joining adjacent arched sections are also reinforced by a reinforcing structure as aforesaid.

The reinforcing structure is preferably interrupted in each arched section, and this can be done in any one of a number of ways. Thus, either the radially outer ring of reinforcing fabric or both rings of reinforcing fabric may be omitted in the arched sections and/or the hard rubber may be omitted or replaced by a ring of softer rubber, preferably of a hardness of not more than 60° Shore A. The preferred arrangement is one in which the outer fabric ring is omitted and the hard rubber is replaced by a softer rubber. Each axial end section of the joint usually terminates in a flange, and preferably the reinforcing structure extends into the flange areas. When the invention is embodied in a dredging sleeve the reinforcing structures as aforesaid are built into the sleeve in place of the usual steel reinforcing rings.

The fabric reinforcing structure comprises cords which may be chosen from many different types of material. Thus, the cords may be metallic, or may be of graphite or carbon. At present, textile cords are preferred, examples of suitable materials being polyamides, polyaramides, polyolefins, modacrylics and polybenzimidazole. The cord is preferably a yarn made up of a number of monofilaments, polyester monofilaments being particularly preferred. One particular example of such a cord is the yarn sold by I.C.I. Fibres Limited under the name "Macrofil", made up of seven polyester monofilaments and having a compression deflection characteristic in the range of from 0.4 to 1.0% under a load of 40 kg.

The cords preferably constitute the warp threads of the fabric, which is cut and incorporated in the structure so that the warp threads extend substantially circumferentially of the rings of fabric.

A specific embodiment of an expansion joint and of a dredging sleeve according to the invention will now be described in more detail, by way of example only, with reference to the accompanying drawings, in which:

FIG. 1 is a radial cross-section through an expansion joint;

FIG. 2 is an enlarged view of part of the joint of FIG. 1;

Figure 3:
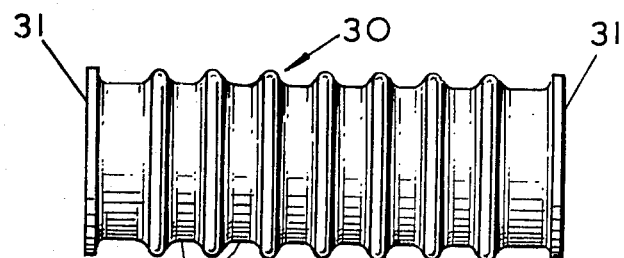
FIG. 3 is a side elevation of dredging sleeve.

As shown in FIG. 1 an expansion joint is of generally tubular form and has first and second axial end sections 1 and 2 joined by a centre section 3 which takes the form of an arch directed radially outwardly from the centre of the joint. Each axial end of the joint terminates in a flange 4 and 5 respectively. The cross-sectional structure of the end sections 1 and 2 of the joint is shown more clearly in FIG. 2. The structure comprises an inner layer 6 made up of a radially innermost liner 7 of polymeric material, a ply 8 of breaker fabric, a coating 9 of adhesive, one or more plies 10 of woven fabric and a further coating 11 of adhesive. Radially outside this inner layer is the reinforcing structure comprising two plies 12 and 13 of reinforcing fabric, a coating 14 of adhesive, a ply 15 of hard polymeric material, a coating 16 of adhesive and two further plies 17 and 18 of fabric reinforcing fabric. Radially outside this reinforcing structure is an outer layer 19 composed of a coating 20 of adhesive, one or more plies 21 of breaker fabric and a final outer layer 22 of polymeric material.

The cross-section of the arched centre section differs from that shown in FIG. 2, by omitting the plies 17 and 18 of reinforcing fabric, and replacing the hard polymeric material 15 by a softer rubber 15a.

The materials used in a particular example of an expansion joint are as follows. The inner liner 7 is a natural rubber compound, although it is possible to use any polymer which will be compatible with the material passing through the joint.

An example of a compound suitable for use in an expansion joint for conveying water is as follows:

| Material | Parts by weight |
| --- | --- |
| Styrene-butadiene copolymer (SBR1509) | 75 |
| Natural rubber | 25 |
| Carbon black (FEF) | 45 |
| Zinc oxide | 2.5 |
| Stearic acid | 1 |
| N-N'diphenylparaphenylene diamine (antioxidant) | 1.5 |
| Arrconox GP - 75% diphenylamine-acetone reaction product or whiting (antioxidant) | 0.75 |
| N-cyclohexyl-2-benzthiozyl sulphenamide (accelerator) | 0.75 |
| Paraffin wax | 1 |
| Heveazone wax | 2 |
| Clay | 75 |
| Aromatic oil | 15 |
| Sulphur | 2.5 |

The adhesive used for the coatings 9, 11, 14, 16 and 20 is a conventional natural rubber compounded adhesive, although again adhesives based on other polymers may be used. Desirably the adhesive is a solution of the compound used for the inner liner 7, a volatile organic solvent such as toluene being used. The outer coating 22 is again a natural rubber compound or any other suitable polymer, and may be the same as or different from the polymer used for the liner 7. The fabric used for the breaker 8 is a close-woven heavy cotton (for example an 1802 cotton hose duck to British Standard 1103, part 8) and in this example a single ply only is used. The fabric used for the plies 10 is preferably the same as that for ply 8 and the number of plies used vary depending on the thickness of the joint flanges and on the working pressure or vacuum which the joint is expected to withstand. The plies 12, 13, 17 and 18 of reinforcing fabric are of a Macrofil fabric woven from a Macrofil warp yarn at 25 ends per inch and a nylon weft yarn at 2 picks per inch, the fabric having a 1500 pounds per inch nominal tensile strength. The Macrofil yarn used is a yarn of seven monofilaments, each of 667 denier, the breaking load of the yarn being 29 kg. and the extension at break being 9%. The compression deflection characteristic of the yarn measured as hereinafter described was 0.4% at 40 kgs. The plies 12, 13, 17 and 18 are cut and aligned so that the Macrofil warp yarns extend substantially circumferentially of the rings.

The fabric in layer 21 is a close-woven heavy cotton, and is preferably the same as the fabric in plies 8 and 10. The hard polymer 15 is a polyacrylonitrile compound having a hardness of 90° C Shore A and made up as follows:

| Material | Parts by weight |
| --- | --- |
| Polyacrylonitrile Breon 1112 | 90 |
| Polyacrylonitrile Breon 232 | 10 |
| Zinc oxide | 3 |
| Phenolic resin (Cellobond J1120W) | 23 |
| Stearic acid | 1 |
| Arrconox GP | 1 |
| Dibutylphthalate | 22 |
| Carbon black (SRF) | 80 |
| Carbon black (FEF) | 40 |
| Sulphur | 2 |
| N-cyclohexyl-2-benzthiazyl sulphenamide | 1 |
| Hexamethylene tetramine | 2 |

The soft rubber 15a is a compound of styrene-butadiene and natural rubber having a Shore A hardness of 60° and was the same as the compound used for the inner liner.

The thickness of the hard and soft rubber layers depends upon the joint size. All the fabric plies, including those of the reinforcing fabric, used in the joint were frictioned with a natural rubber compound in order to improve adhesion.

The joint described was built on a suitable mandrel and after building, the joint was spirally wrapped with nylon wrappers, the wrapping taking place under tension to consolidate the various plies of the joint. After wrapping the joint was vulcanised in conventional manner, the wrapping removed and the joint was then ready for use, by bolting between the components to be joined.

Figure 4:
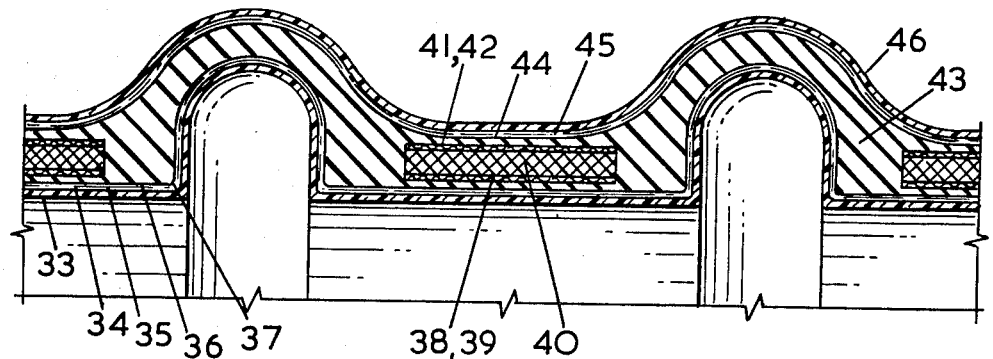
FIG. 4 is an enlarged cross-section through part of the wall of a dredging sleeve.

FIG. 3 shows a dredging sleeve having a body 30 terminating in flanges 31, the body being reinforced by a number of spaced reinforcing structures such as 32. The longitudinal cross-sectional structure of the sleeve is shown in FIG. 4. The structure comprises an linner liner 33 of polymeric material, a ply 34 of breaker fabric, a coating 35 of adhesive, one or more plies 36 of woven fabric and a further coating 37 of adhesive. At spaced intervals along the length of the sleeve, there is incorporated a reinforcing structure comprising plies 38, 39 of reinforcing fabric, a ring 40 of hard polymeric material and two further plies 41, 42 of reinforcing fabric. These are embedded in a body 43 of soft rubber and the sleeve is finished by a coating 44 of adhesive, one or more plies 45 of breaker fabric and a final outer layer 46 of polymeric material.

The materials used can be the same as those exemplified for use in an expansion joint.

Figure 5:
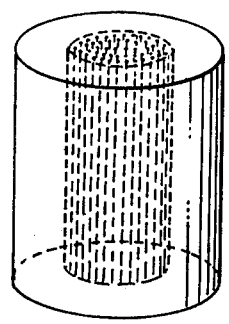
FIG. 5 is a diagram relating to a test method used for measuring compression modulus of cord for use in the invention.

FIG. 5 illustrates a test which may be used for finding the compression deflection characteristic of cord which may be thought suitable for use in the joint of the invention. To measure the compression deflection characteristic 100 ends of the reinforcing cord were embedded in a cylinder of rubber and the compression in a line parallel to the axes of the cords was measured as the compression load was increased. The test piece is shown diagrammatically in FIG. 3, the dimensions of the test piece being 1 inch diameter and 1 inch height, with the core made up of the cords being ½ inch diameter. A graph is made of compression against load in kilogrammes and, as already stated, for the cords to be suitable for use in joints according to the invention the compression of the test piece, which is given as the compression deflection characteristic of the cord, must not exceed 1% at a load of 40 kg.

Various modifications and alternatives to the embodiments of the invention disclosed herein are within the skill of the art without departing from the scope of the invention as defined by the claims.

We claim:

1. An expansion joint or dredging sleeve comprising two annular end sections joined by an intermediate outwardly arched section, each end section terminating in a flange, the sleeve having a body built up from rubber and fabric ply construction throughout its length, a reinforcement in each end section comprising a ring of rubber having a Shore A hardness of not less than 70° sandwhiched between two rings of a fabric comprising cords which have a compression deflection characteristic not exceeding 1% under a load of 40 kg, said cords extending substantially circumferentially of the rings and the reinforcement extends into each flange, a reinforcement in the intermediate section including a ring of rubber of a hardness not more than 60° Shore A, said ring being of substantially the same thickness as the ring in the end section reinforcement.

2. An expansion joint or dredging sleeve according to claim 1 in which the ring of rubber in each end section is a polyacrylonitrile compound having a hardness of about 90° Shore A.

3. An expansion joint or dredging sleeve according to claim 1 in which the cord is a textile cord selected from polyamides, polyaramides, polyolefins, modacrylics and polybenzimidazole.

4. An expansion joint or dredging sleeve according to claim 3 in which the cord is a yarn comprising polyester monofilaments.

5. An expansion joint or dredging sleeve according to claim 4 in which the cord has a compression deflection characteristic in the range of from 0.4 to 1% under a load of 40 kg.

6. An expansion joint according to claim 1 comprising a plurality of intermediate arched sections, each pair of intermediate arched sections being joined by an annular intermediate section, the annular end sections and annular intermediate sections being reinforced by the reinforcement.

7. An expansion joint according to claim 6 in which the end structure reinforcement terminates at the arched sections.

8. An expansion joint according to claim 6 in which each of the radially outer rings of reinforcing fabric in the end sections and the intermediate sections terminates at the arched sections.

9. An expansion joint according to claim 6 in which each ring of rubber in the end sections and the intermediate sections terminates at the arched sections.

10. An expansion joint according to claim 1 wherein the end section reinforcement terminates at the arched section.

11. An expansion joint according to claim 1 wherein the radially outer ring of reinforcing fabric in the end sections terminates at the arched section.

12. An expansion joint according to claim 1 wherein the ring of rubber in the end sections terminates at the arched section.

13. An expansion joint according to claim 1 wherein the ring of rubber in the end section is a single ring.

14. An expansion joint according to claim 1 wherein the ring of rubber in the intermediate section is a single ring.

15. An expansion joint according to claim 6 wherein the rings of rubber in the end sections, the intermediate arched sections and the intermediate annular section, respectively, is a single ring.

* * * * *